US012576921B2

(12) United States Patent
Nguyen

(10) Patent No.: US 12,576,921 B2
(45) Date of Patent: Mar. 17, 2026

(54) FINISH PART AND STRUCTURE

(71) Applicant: LTI Holdings, Inc., Pleasanton, CA (US)

(72) Inventor: Joseph Nguyen, Onalaski, WI (US)

(73) Assignee: A. B. BOYD CO., Pleasanton, CA (US)

( * ) Notice: Subject to any disclaimer, the term of this patent is extended or adjusted under 35 U.S.C. 154(b) by 342 days.

(21) Appl. No.: 18/169,052

(22) Filed: Feb. 14, 2023

(65) Prior Publication Data

US 2024/0270326 A1 Aug. 15, 2024

(51) Int. Cl.
*B62D 29/04* (2006.01)
*B32B 3/02* (2006.01)
(Continued)

(52) U.S. Cl.
CPC .............. *B62D 29/043* (2013.01); *B32B 3/02* (2013.01); *B32B 3/06* (2013.01); *B32B 3/10* (2013.01); *B32B 3/26* (2013.01); *B32B 3/263* (2013.01); *B32B 3/266* (2013.01); *B32B 3/28* (2013.01); *B32B 3/30* (2013.01); *B62D 65/06* (2013.01); *Y10T 428/12201* (2015.01); *Y10T 428/12229* (2015.01); *Y10T 428/12264* (2015.01); *Y10T 428/12271* (2015.01); *Y10T 428/12299* (2015.01); *Y10T 428/12354* (2015.01); *Y10T 428/12361* (2015.01); *Y10T 428/12368* (2015.01); *Y10T 428/12375* (2015.01); *Y10T 428/12389* (2015.01); *Y10T 428/12396* (2015.01); *Y10T 428/1241* (2015.01)

(58) Field of Classification Search
CPC ........ B62D 29/043; B62D 65/06; B32B 3/02; B32B 3/06; B32B 3/10; B32B 3/26;
B32B 3/263; B32B 3/266; B32B 3/28; B32B 3/30; Y10T 428/12229; Y10T 428/12201; Y10T 428/12264; Y10T 428/12299; Y10T 428/12354; Y10T 428/12361; Y10T 428/12368; Y10T 428/12375; Y10T 428/12389; Y10T 428/12396; Y10T 428/1241
See application file for complete search history.

(56) References Cited

U.S. PATENT DOCUMENTS

2018/0073247 A1* 3/2018 Underkofler .......... E04B 9/0428

FOREIGN PATENT DOCUMENTS

WO WO-2019170969 A2 * 9/2019 ......... B60R 16/0239

OTHER PUBLICATIONS

Machine Translation, Faget, WO 2019/170969, Sep. 2019. (Year: 2019).*

* cited by examiner

*Primary Examiner* — Michael E. La Villa
(74) *Attorney, Agent, or Firm* — CANTOR COLBURN LLP

(57) ABSTRACT

A finish part including a metal body, a metal engagement arm extending integrally from the body, a detent depending from the arm, the detent being formed from the metal of the arm that is plastically deformed out of a plane of the arm. A method for installing a finish part including aligning the engagement arm of the finish part with an opening in a structure upon which the part is to be installed, and urging the engagement arm and the detent into the opening. A structure including a frame having exposed unfinished surfaces, and the metal finish part disposed upon the unfinished surface and that finishes the unfinished surface.

11 Claims, 8 Drawing Sheets

(51) Int. Cl.

| | | |
|---|---|---|
| *B32B 3/06* | (2006.01) | |
| *B32B 3/10* | (2006.01) | |
| *B32B 3/26* | (2006.01) | |
| *B32B 3/28* | (2006.01) | |
| *B32B 3/30* | (2006.01) | |
| *B62D 65/06* | (2006.01) | |

FINISH PART AND STRUCTURE

BACKGROUND

Many industries produce products having structure that is necessary to the product but lacks aesthetically pleasing external attributes. In such cases, it is often desirable to cover more unsightly structural elements of the product with surface coverings and trim pieces (collectively referred to hereinafter as "trim") that enhance the appearance of the product. In some cases, the trim may include functional aspects rather than only appearance related aspects or may exhibit both function and appearance related aspects. In any event, trim needs to be secured to the structure of the product. Traditionally, securement is done with clips that are independent of the trim and pressed through an opening therein or over a portion thereof, or with extra length on tabs of the trim components for folding over mating parts. While securement of trim in this way is reliable, such securement paradigm requires a non trivial amount of time in the assembly process and is prone to cause scratches or other blemishes that may reduce value of the assembled product, lead to customer dissatisfaction or in some cases may lead to scrapping of the product. Efficiency in production and reduction in quality control issues and rejects are all important to manufacturing industries and hence the art would well receive alternatives that improve outcomes related to these considerations.

SUMMARY

An embodiment of a finish part including a metal body, a metal engagement arm extending integrally from the body, a detent depending from the arm, the detent being formed from the metal of the arm that is plastically deformed out of a plane of the arm.

An embodiment of a method for installing a finish part including aligning the engagement arm of the finish part with an opening in a structure upon which the part is to be installed, and urging the engagement arm and the detent into the opening.

An embodiment of a structure including a frame having exposed unfinished surfaces, and the metal finish part disposed upon the unfinished surface and that finishes the unfinished surface.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
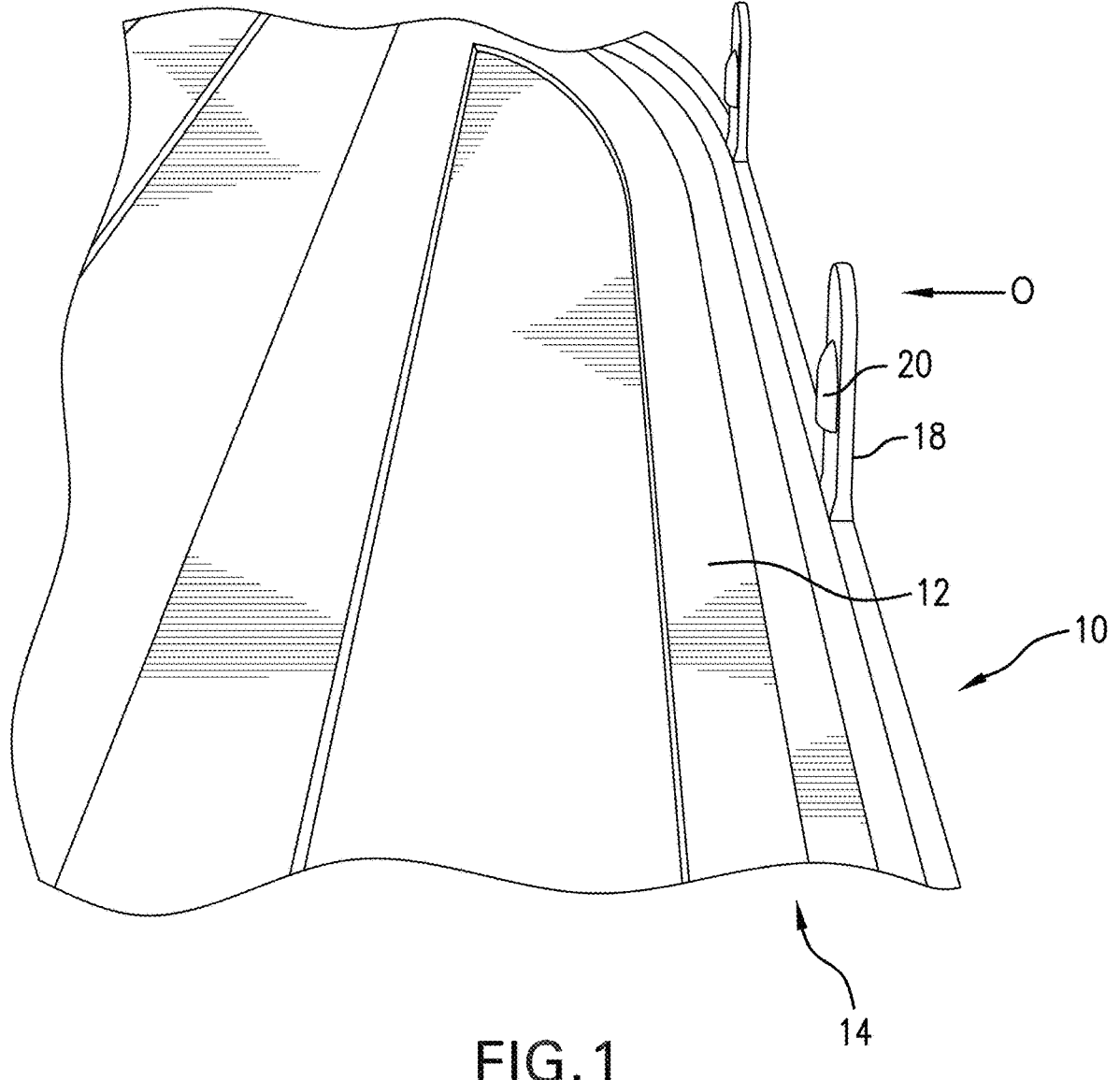
FIG. 1 is a perspective view of a finish part as described herein.
Figure 2:
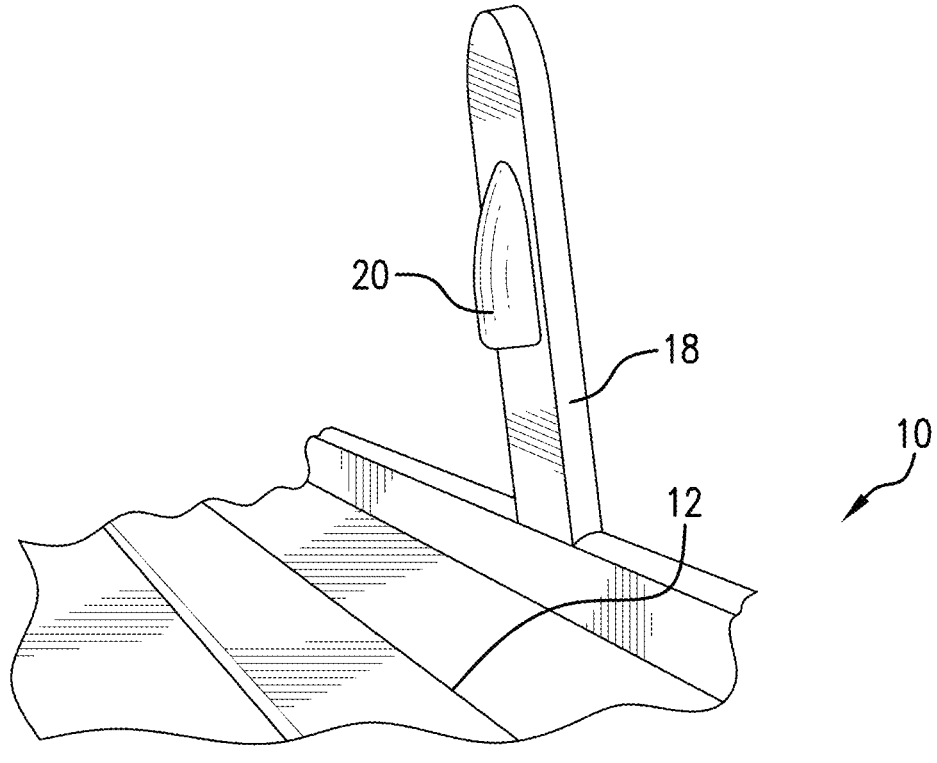
FIG. 2 is an enlarged view of a portion of FIG. 1.
Figure 3:
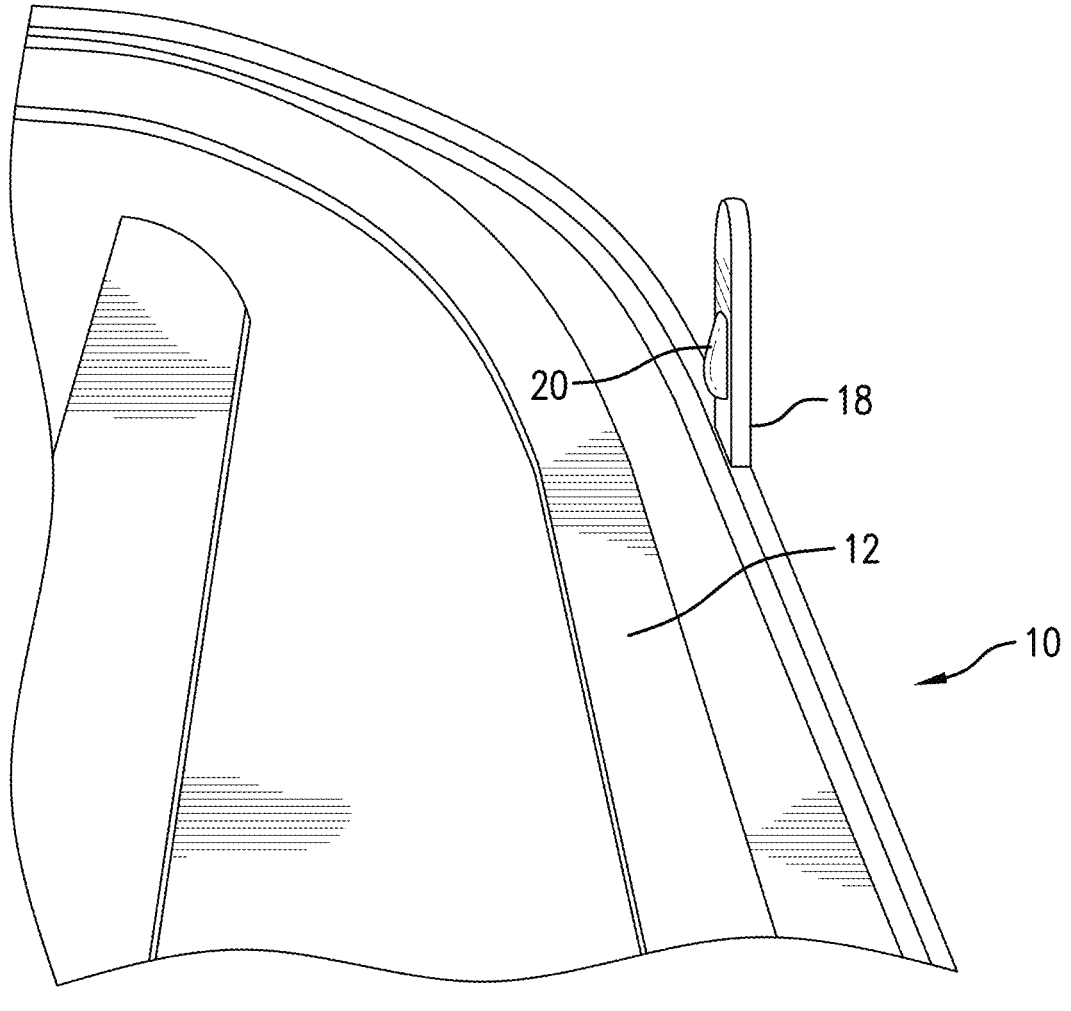
FIG. 3 is another enlarged view of a portion of FIG. 1.

Referring to FIGS. 1-4, a finish part 10 is illustrated. The finish part 10 includes a metal body 12 that has a portion thereof, generally a surface 14, that is configured with a finish such as paint, polish, or an aesthetically pleasing texture, for example. This surface is not visible in FIG. 1 because FIG. 1 illustrates the functional underside of the finish part 10. The finished surface 14 is on the opposite surface of the part 10 from what is shown in FIG. 1. The surface 14 is, however, visible in FIG. 6, which shows the finish part 10 engaged with a structure 16. Finish surfaces of trim are often created for products, such as automobiles, and need to be in perfect condition to preserve the look and feel of the product. Commonly, fasteners or clips of some type are inserted through the trim to secure the trim to the underlying structure 16. While they work well to secure the trim, they always risk damaging the trim. Further, each individual additional component of a system (e.g., trim and fastener, for example) that requires installation increases time and cost for the manufacturer or assembler. In accordance with this disclosure, these drawbacks are avoided with the creation of the finish part 10. Finish part 10 comprises both what would be the trim as described above and the securement in a single piece of metallic material. The part 10 includes the aesthetically pleasing surface 14 of the body 12 and the securement extends integrally therefrom as discussed in greater detail below. Engagement of the part 10 with the structure 16 is accomplished quickly and securely, while avoiding induced blemishes, and without additional components or operations in accordance with the disclosure hereof.

Regarding securement, the part 10 includes a metal integrally formed engagement arm 18 that depends from the body 12. The engagement arm 18 includes a detent 20 depending from the arm 18. The detent 20 is formed from a material (metal) of the arm 18 that is deformed plastically out of a plane of the arm 18. The material of the arm 18 and the material of the detent 20 are the same material and are contiguous with one another.

Figure 4:
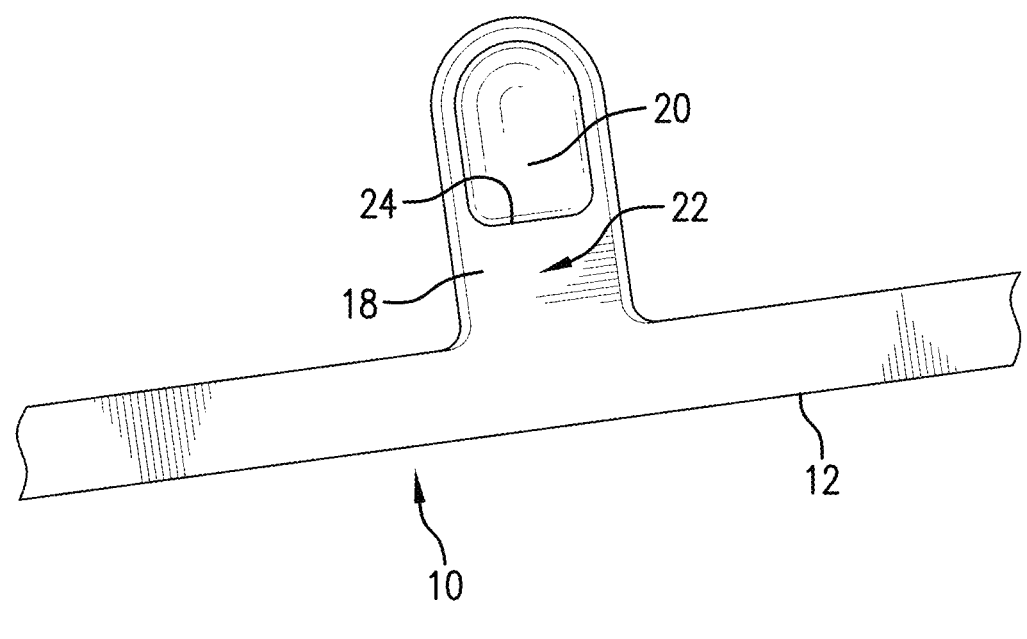
FIG. 4 is a view of an engagement arm and detent.
Figure 5:
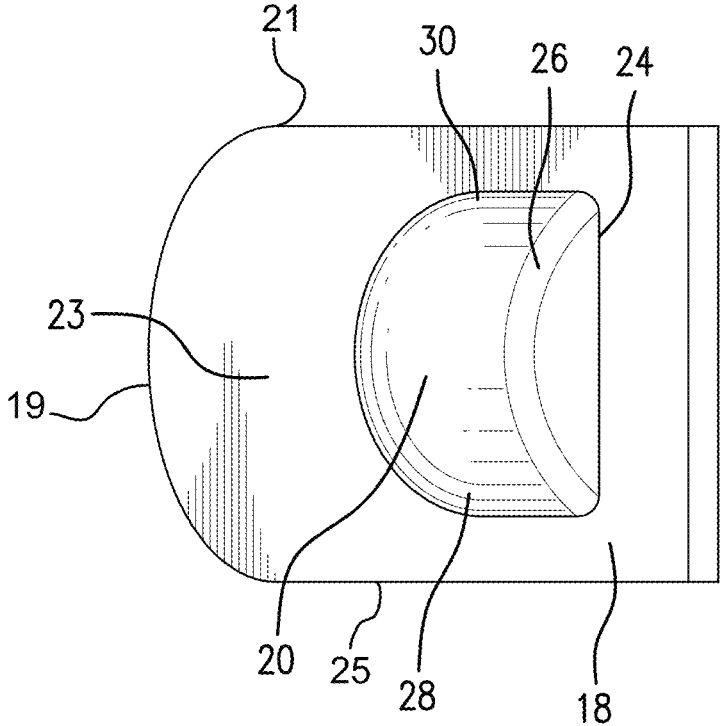
FIG. 5 is a view of an engagement arm and detent removed from the rest of the finish part.

Referring to FIGS. 4 and 5, the arm 18 and detent 20 are enlarged for better understanding. FIG. 4 illustrates the shape of the detent 20 from the outside of FIG. 1 (i.e. in the direction of arrow O in FIG. 1). As will be appreciated from a review of FIG. 4, the detent 20 is a rounded depression in a surface 22 and a rounded convexity in a surface 23 of arm 18. The portion of material of arm 18 that becomes detent 20 is stretched when detent 20 is formed. It is to be appreciated that while the figures illustrate the detent being deformed toward a center of the part 10 or in the direction of surface 23 (as shown), it is contemplated that the detent could rather be deformed away from the center of the part or in the direction of surface 22 and work identically. The detent, simply in the deformed condition, may be used for securement based upon frictional engagement with an opening in structure 16. In other embodiments, a single cut 24 may be made through the arm 18, to allow greater deflection of detent 20 during the deforming creation of the detent 20 and to produce an edge 26 that is visible in FIG. 5. It is noted that the view in FIG. 5 is a view of the opposite surface 23 of arm 18 from surface 22 shown in FIG. 4. Deflection of the detent 20 is variable depending upon desired tightness of the resulting connection with structure 16 and the desire for semi permanent or permanent installation of the finish part 10. In some embodiments the detent 20 will be pushed out of plane of the arm 18 by a distance equal to a thickness of the material of the arm 18. In other embodiments, the detent 20 may be deformed by a distance that is equal to more than a thickness of the material of the arm 18 or by a distance that is equal to less than a thickness of the material of the arm 18.

It is to be appreciated that, the arm has a length measured from the body 12 to an end 19 of the arm 18 and a width perpendicular to the length extending from a first side edge 21 to a second side edge 25. The detent has a width from detent side 28 to detent side 30 that is less than the width of the arm 18, and that sides 28 and 30 of the detent 20 are not cut from the arm 18 but rather remain connected thereto. This configuration increases strength of the detent 20 in that it promotes the stretching of the material of arm 18 between sides 28 and 30 during formation of the detent 20. Such configuration provides for a significant amount of resistance in the detent 20 to deformation back into the plane of the arm 18 when the detent is compressed during securement and while secured to structure 16. Therefore, the detent is ideally configured to reliably and securely hold the finish part 10 to the structure 16 for an extended period of time with resistance to hard use and temperature variation. This is true regardless of whether the particular embodiment includes the cut 24 or does not include the cut 24, although embodiments with the cut 24 and resulting edge 26 will have even greater retention characteristics since the edge 26 will tend to bite into the structure 16, when installed therein.

It is to be appreciated that while two of the arms 18 are illustrated per side of the finish part 10, more or fewer are contemplated.

Figure 6:
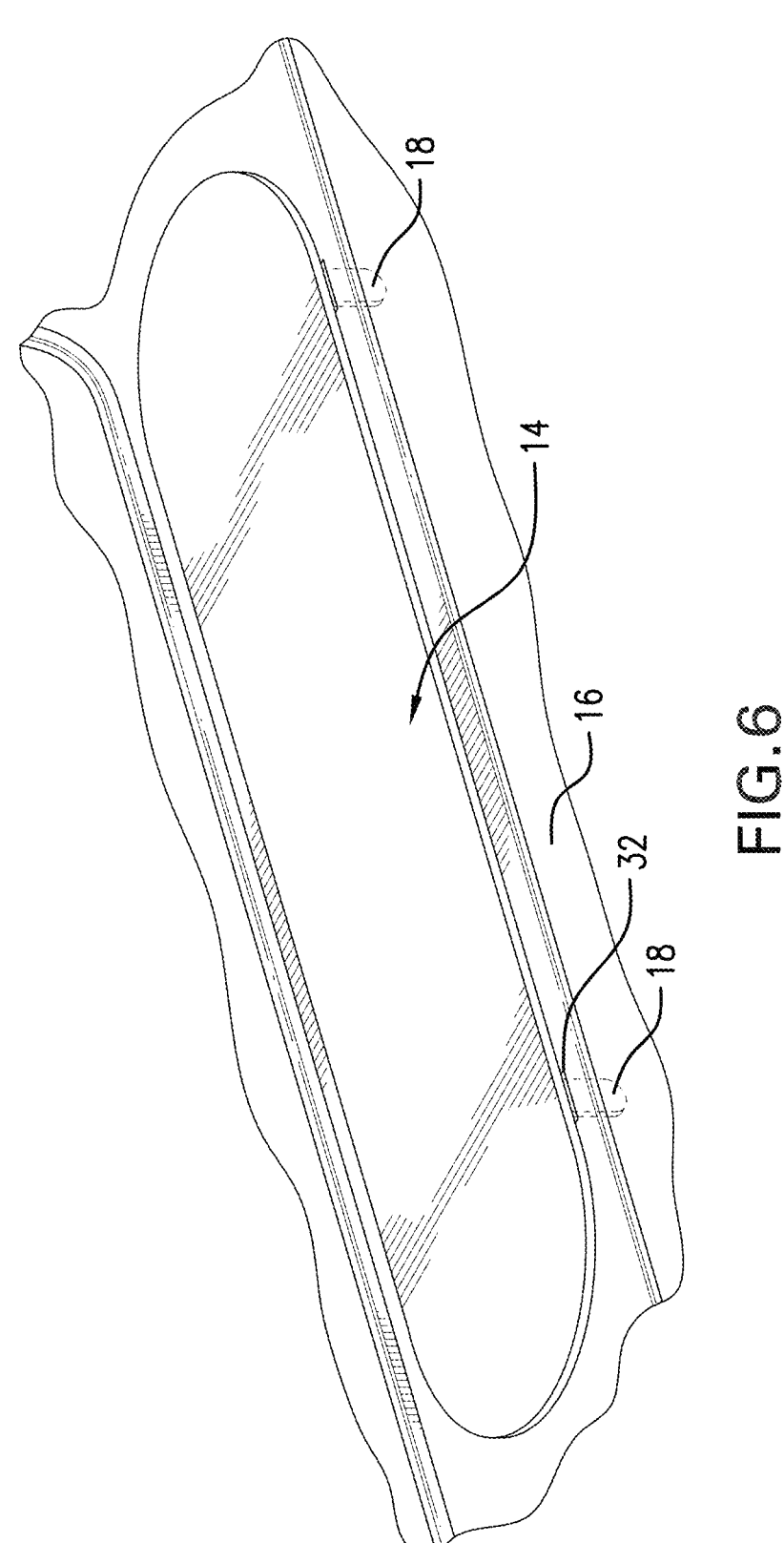
FIG. 6 is a view of a structural member with a finish part installed thereon.
Figure 7:
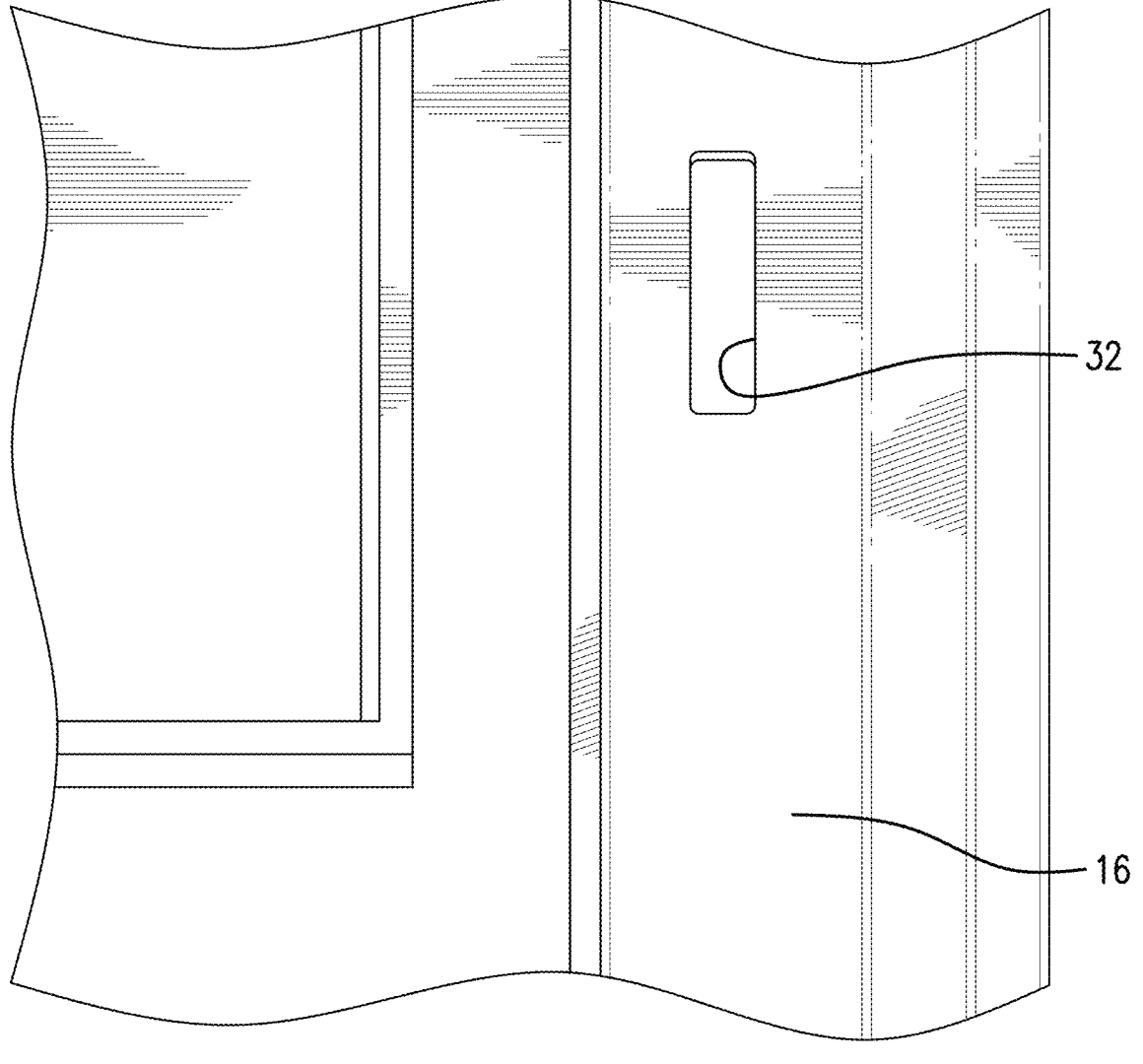
FIG. 7 is a view of the structural member from an opposite side of where the finish part will be disposed.
Figure 8:
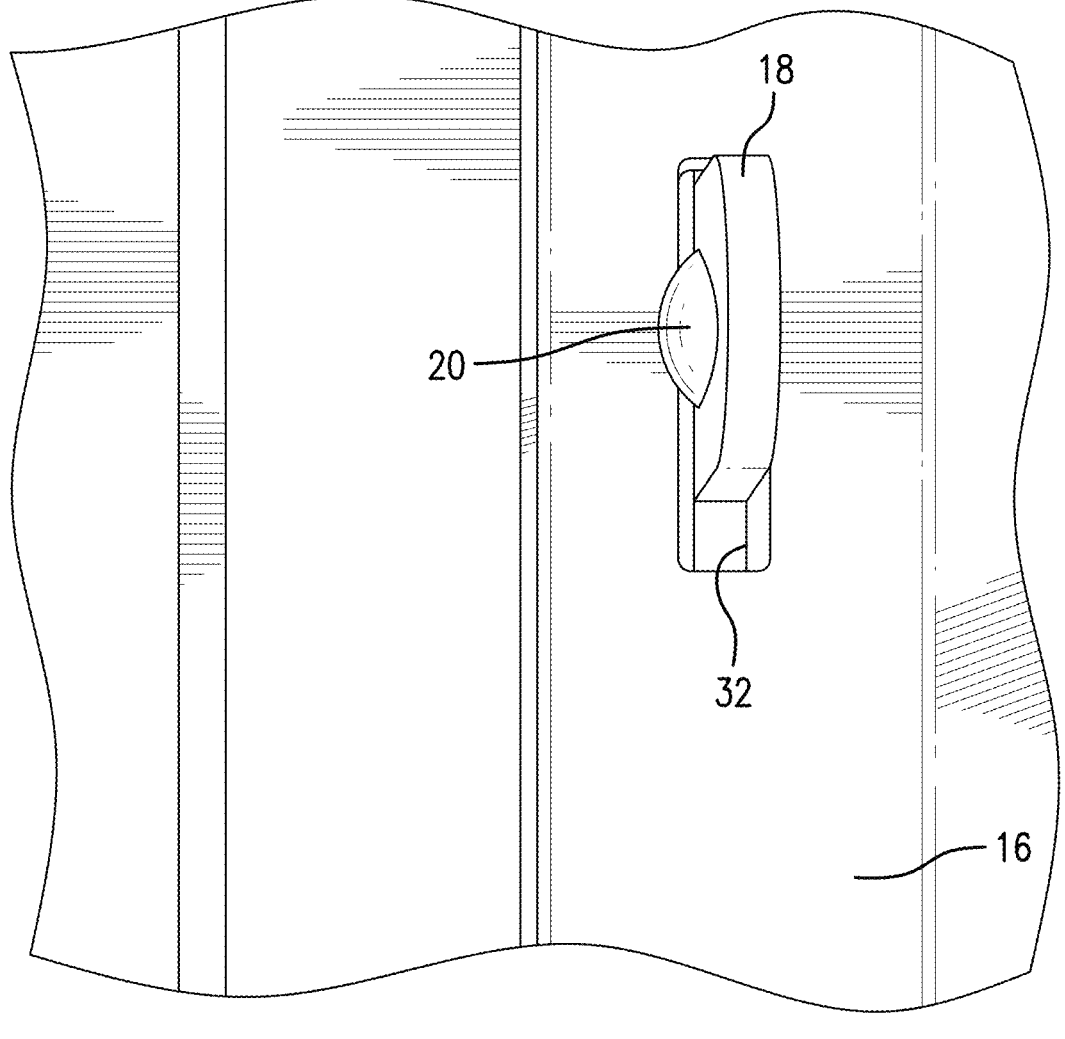
FIG. 8 is the view of FIG. 7 but with the engagement arm disposed in the structural member.

Referring to FIGS. 6, 7 and 8 the finish part 10 is illustrated installed on a structure 16 that could be any structure upon which a finished appearance is desirable. The part 10 is quickly engaged with the structure 16 simply by pushing the arms 18 into openings 32 in the structure 16 that are aligned with the arms 18. The openings 32 are of dimensions that allow clearance of the arm 18 but provide for an interference fit of the detent 20. Hence, pushing the part 10 into contact with the structure 16 will semi permanently or permanently engage the part 10 with the structure 16, depending upon how far out of plane the detent 20 is originally deformed. All of this operation is conducted on the finished side of the part and no access to a back side of the structure 16 is necessary, thereby increasing efficiency.

Set forth below are some embodiments of the foregoing disclosure:

Embodiment 1: A finish part including a metal body, a metal engagement arm extending integrally from the body, a detent depending from the arm, the detent being formed from the metal of the arm that is plastically deformed out of a plane of the arm.

Embodiment 2: The part as in any prior embodiment, wherein at least a portion of the detent is deformed by distance greater than a thickness of the metal of the arm.

Embodiment 3: The part as in any prior embodiment, wherein the detent includes an edge.

Embodiment 4: The part as in any prior embodiment, wherein the edge is formed by a cut through the metal of the arm.

Embodiment 5: The part as in any prior embodiment, wherein the edge is parallel to a surface against which the part is to be secured.

Embodiment 6: The part as in any prior embodiment, wherein the edge is parallel to the body.

Embodiment 7: The part as in any prior embodiment, wherein the detent other than the edge remains contiguous with the arm.

Embodiment 8: The part as in any prior embodiment, wherein the finish part is a trim piece.

Embodiment 9: The part as in any prior embodiment, wherein the trim piece is a vehicular trim piece.

Embodiment 10: A method for installing a finish part including aligning the engagement arm of the finish part as in any prior embodiment with an opening in a structure upon which the part is to be installed, and urging the engagement arm and the detent into the opening.

Embodiment 11: The method as in any prior embodiment, further including causing an edge of the detent to bite into the structure.

Embodiment 12: A structure including a frame having exposed unfinished surfaces, and the metal finish part as in any prior embodiment disposed upon the unfinished surface and that finishes the unfinished surface.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" includes a range of ±8% of a given value.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A finish part comprising:
    a metal body;
    a metal engagement arm extending integrally from the body, the arm having a length measured from the body to an end of the arm and a width perpendicular to the length extending from a first edge to a second edge;
    a detent depending from the arm and disposed between the first and second edge, the detent having a width that is less than the width of the arm, the detent being formed from the metal of the arm that is plastically deformed out of a plane of the arm by a distance greater than a thickness of the metal of the arm.

2. The part as claimed in claim 1, wherein the finish part is a trim piece.

3. The part as claimed in claim 2, wherein the trim piece is a vehicular trim piece.

4. A structure comprising:

a frame having exposed unfinished surfaces; and the metal finish part as claimed in claim 1 disposed upon the unfinished surface, the detent being engaged with the unfinished surface, and that finishes the unfinished surface.

5. A finish part comprising:

a metal body;

a metal engagement arm extending integrally from the body, the arm having a length measured from the body to an end of the arm and a width perpendicular to the length extending from a first edge to a second edge;

a detent depending from the arm and disposed between the first and second edge, the detent having a width that is less than the width of the arm, the detent being formed from the metal of the arm that is plastically deformed out of a plane of the arm, wherein the detent includes an edge.

6. The part as claimed in claim 5, wherein the edge is formed by a cut through the metal of the arm.

7. The part as claimed in claim 5, wherein the edge is parallel to a surface against which the part is to be secured.

8. The part as claimed in claim 5, wherein the edge is parallel to a plane of the body.

9. The part as claimed in claim 5, wherein the detent other than the edge remains contiguous with the arm.

10. A finish part comprising:

a metal body;

a metal engagement arm extending integrally from the body; and a detent depending from the arm, the detent being formed from the metal of the arm that is plastically deformed out of a plane of the arm, the detent including an edge, wherein the detent other than the edge remains contiguous with the arm.

11. A finish part comprising:

a metal body;

a metal engagement arm extending integrally from the body; and a detent depending from the arm, the detent being formed from the metal of the arm that is plastically deformed out of a plane of the arm, and wherein at least a portion of the detent is deformed by distance greater than a thickness of the metal of the arm.

* * * * *